H. W. DYER.
TIRE TREAD CONSTRUCTION.
APPLICATION FILED MAR. 16, 1914. RENEWED DEC. 13, 1917.
1,273,046.
Patented July 16, 1918.
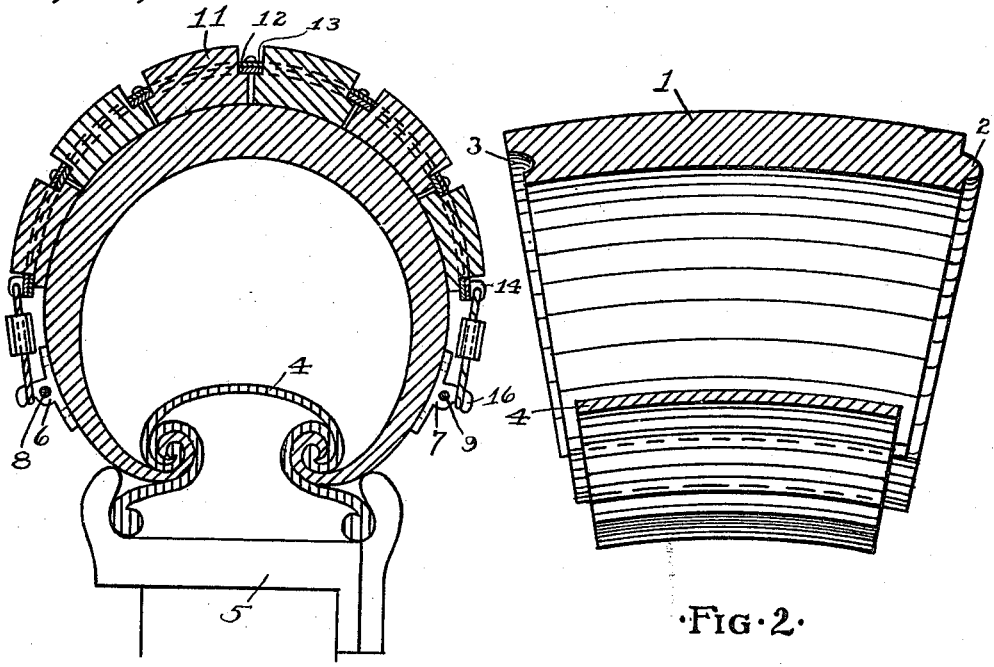
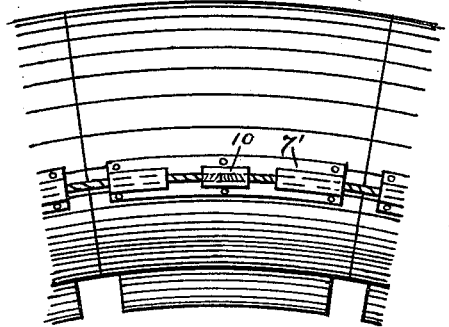
·FIG·3·
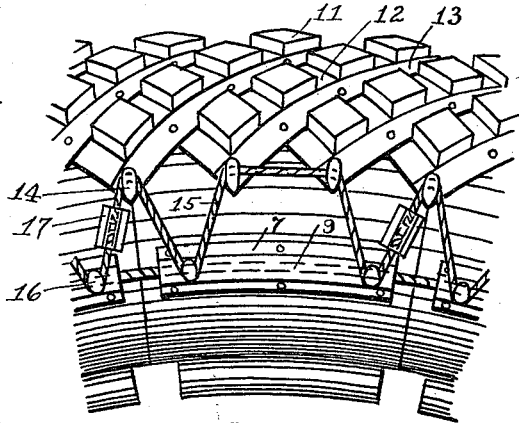
·FIG·4·
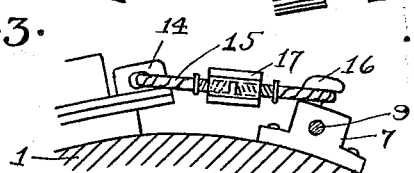
·FIG·5·
WITNESSES:
INVENTOR
Harry W. Dyer
BY
Lewis J. Doolittle
ATTORNEY

UNITED STATES PATENT OFFICE.

HARRY W. DYER, OF EAST ORANGE, NEW JERSEY.

TIRE-TREAD CONSTRUCTION.

1,273,046.   Specification of Letters Patent.   Patented July 16, 1918.

Continuation in part of application Serial No. 615,053, filed March 17, 1911. This application filed March 16, 1914, Serial No. 824,863. Renewed December 13, 1917. Serial No. 207,005.

*To all whom it may concern:*

Be it known that I, HARRY W. DYER, a citizen of the United States, and resident of East Orange, Essex county, New Jersey, have invented certain new and useful Improvements in Tire-Tread Construction, of which the following is a specification.

This invention relates to improvements in resilient tires for vehicle wheels and more particularly to the tread construction.

This application is a continuation of my application filed March 17, 1911, under Serial No. 615,053, in which the claims were directed to the tire construction.

In carrying out the invention I provide a tread construction which is adapted for use with an ordinary tire or with a sectional tire construction, such as shown in my application above referred to. The tread is composed of a number of body portions which overlap the several tire sections, when used with a sectional construction of the type described. The tread sections are prevented from displacement by means of flexible retaining members which connect and hold the same upon the tire body in such a manner as to provide for the relative movement and desired flexibility, all of which will be described more fully hereinafter in connection with the description of the invention as illustrated in the accompanying drawings.

In the drawings like parts in the several views have been given the same reference numerals.

Figure 1 is a cross sectional view of a tire with the tread positioned thereon.

Fig. 2 is a sectional side view of one of the portions of the tire body with the tread removed.

Fig. 3 is a side elevation of a tire body, drawn to a somewhat smaller scale, with the tread removed.

Fig. 4 is a view similar to Fig. 3, showing the tread in position on the tire.

Fig. 5 is an enlarged fragmentary view showing a portion of the fastening means for holding the tread in position.

In the form as shown, the tire body is composed of a number of resilient portions or sections 1, which are interlocked by means of the projection 2 and recess 3 at the opposite abutting ends. The inner edges of the tire sections 1 are connected together by means of the spring 4 and are positioned upon the wheel rim 5 in the manner fully described in my former application above referred to.

Tubular holding members 6 and 7 (or 7') are fastened upon opposite sides of the tire sections 1 and cables 8 and 9 passed through the same, the ends of the cable being secured together by suitable means, such as the turnbuckle 10.

The tire tread is composed of a number of sections, such as 11, arranged in rows extending diagonally of the tire and which are of angular form in plan view and inverted T-shape in cross-section to provide laterally projecting base flanges extending around all four sides thereof and are held in position upon the tire body by means of a number of strips, such as 12 and 13, preferably constructed of resilient or yielding material crossed and positioned angularly over the tire body and riveted together, as shown in Fig. 4. These strips each overlap a pair of adjacent base-flanges, as indicated in Fig. 1.

These retaining strips 12 and 13 are preferably pivotally connected or joined together at their ends and provided with eyelet members 14, through which a flexible cable 15 is passed. The cable 15 is laced between the eyelet members 14 and hook-shaped projections 16 upon the tubular holding members 7. A number of turnbuckles 17 may be interposed at intervals in said cable 15 for tightening and fastening the same, as shown in Figs. 4 and 5.

The tread may be readily removed or any of the several sections thereof replaced as the same become worn and the construction and arrangement is such as to permit the yielding of the tire in every direction, thus providing the required resiliency which is essential in these constructions.

It will be seen that the tread may be used in connection with tires of ordinary construction and provides an additional wearing surface and protection for the tire body. When used in connection with a sectional tire construction, such as shown, the tread assists in holding the several sections in position and preventing the same from becoming displaced upon the rim.

It will be obvious that the invention lends itself to various modifications and constructions which adapt the same for use with various forms of tires and I do not intend to limit myself to the exact details of construction shown and described, which are intended as illustrative merely of one of the various modifications of the invention.

What I claim is:—

1. A tire tread comprising a number of separate sections of rectangular form in plain view, such sections being arranged in rows and having laterally projecting base-flanges extending around all four sides thereof, a number of retaining strips of yielding material each extending the length of each row of sections, such strips crossing over one another and engaging the upper surfaces of said base-flanges, each of said strips overlapping a pair of adjacent base-flanges and means securing said retaining strips together at the points where they cross each other.

2. A tire tread comprising a number of separate sections of rectangular form in plan view and arranged in rows disposed diagonally of the tire, such sections having laterally projecting base-flanges extending around all four sides thereof, a number of retaining strips of yielding material each extending the length of each row of sections and arranged diagonally of the tire, such strips crossing over one another and engaging the upper surfaces of the same base-flanges, each of said strips overlapping a pair of adjacent base-flanges and means securing said retaining strips together at the points where they cross each other.

Signed at New York city, in the county and State of New York, this 13th day of March, 1914.

HARRY W. DYER.

Witnesses:
 AGNES SCHASSES,
 GERTRUDE BRAUN.

Copies of this patent may be obtained for five cents each, by addressing the "Commissioner of Patents, Washington, D. C."